United States Patent Office
3,667,846
Patented June 6, 1972

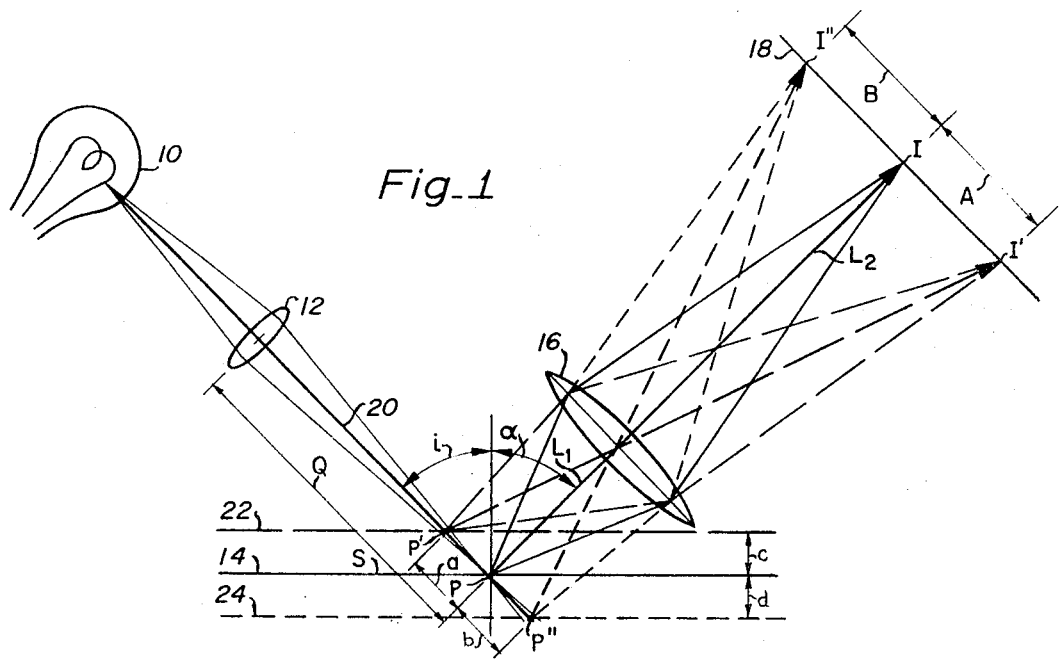
Fig_1
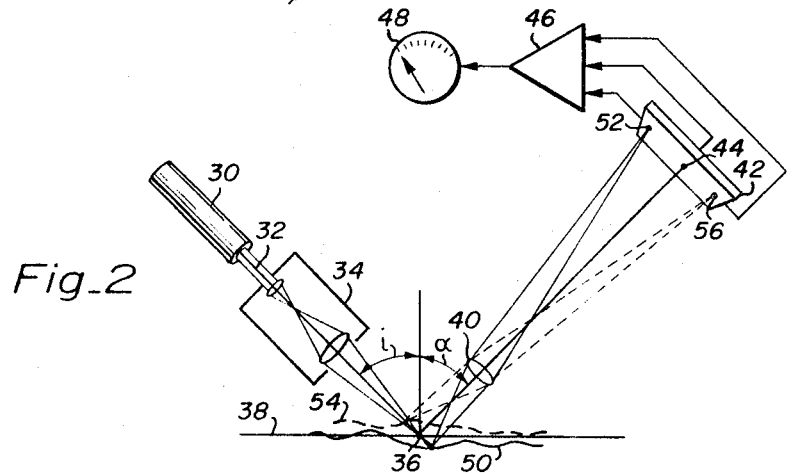
Fig_2
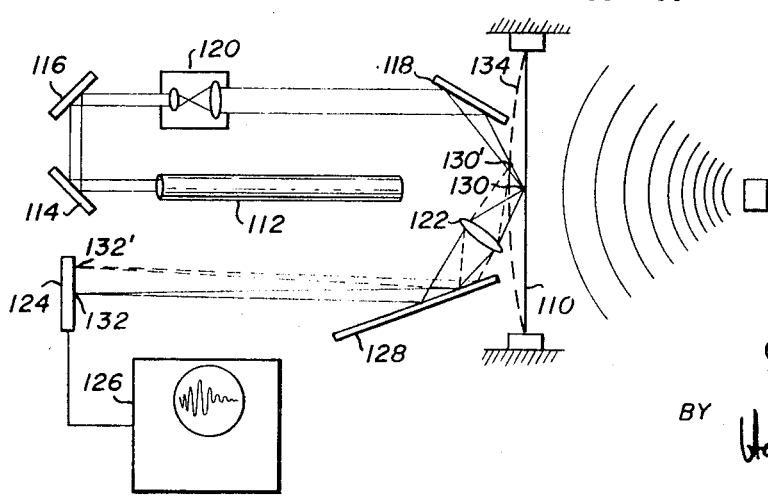
Fig_4
INVENTORS
CHARLES NATER
WILLARD E. BUCK
ATTORNEY

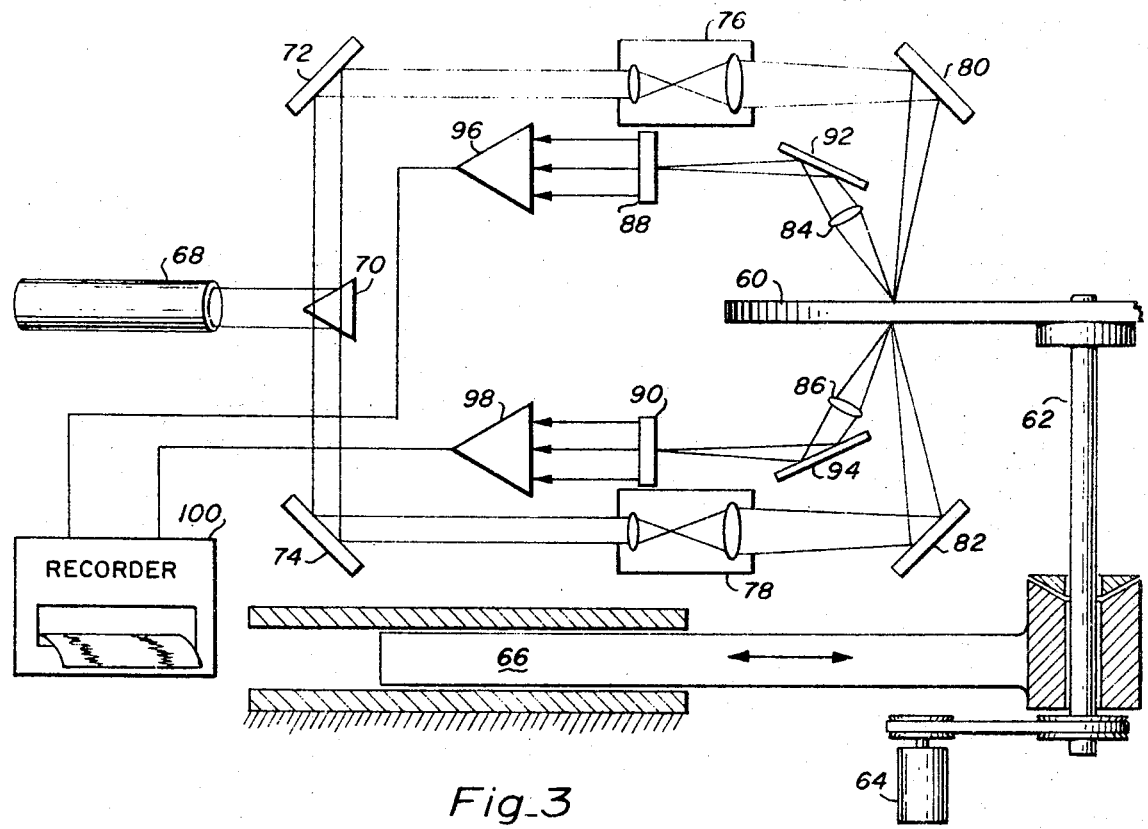
Fig_3
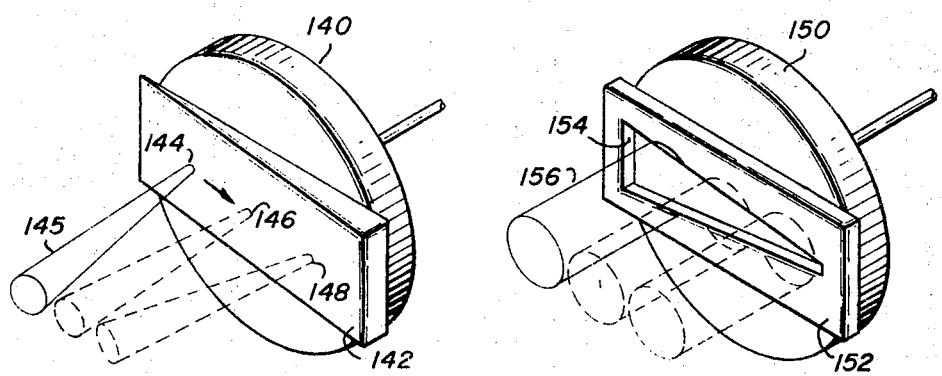
Fig_5        Fig_6

3,667,846
OPTICAL SURFACE INSPECTION APPARATUS
Charles Nater, 1519 Brookvale Drive, San Jose, Calif. 95125, and Willard E. Buck, 1951 Poplar, Lake Havasu City, Ariz. 86403
Filed July 28, 1969, Ser. No. 845,163
Int. Cl. G01b 11/30
U.S. Cl. 356—120
9 Claims

ABSTRACT OF THE DISCLOSURE

An apparatus for optically detecting microscopic irregularities or relative elevational variations in or of a material surface comprising a means for illuminating a microscopic area of the surface to be monitored or evaluated, an optical detector means which produces an output signal responsive to the position of a light spot cast thereupon, and an optical lens system for imaging the illuminated surface area onto the detector means. Preferably, both the illuminating means and the imaging lens system have their optical axes angularly disposed relative to the work surface so that a change in the elevation of the illuminated surface area will produce a shift in the position of the spot imaged onto the detector.

BACKGROUND OF THE INVENTION

This invention relates generally to precision measuring instruments and, more particularly, to an apparatus for optically detecting microscopic irregularities or relative elevational variations in or of the surface of a work material.

Many types of optical inspection devices have heretofore been provided to detect flaws or other irregularities in the surface of a material. Notable among these devices are those disclosed in the patents to Woods 2,947,212, Hoffman, 3,046,407, Burgo et al. 3,206,606, Beguin 3,235,672 and Beattie et al. 3,427,109. Each of these disclosures, however, relate to optical sensing devices wherein light is directed onto the surface to be inspected and the intensity of the reflection, or the mere presence of a reflection, is detected by a photosensitive detection means.

These types of devices, however, suffer from the disadvantage that the detector apparatus is responsive solely to changes in light intensity. Consequently, by different types of surface irregularities, as well as environmental conditions, may produce indistinguishable responses. For example, a slight change in the reflective properties of the surface being illuminated may cause the detector to see an indication which would be similar to that caused by a scratch or dent in the surface of the material.

Furthermore, such apparatus is incapable of detecting slight departures of the inspected surface away from a predetermined reference point or plane, except by incidentally causing some of the reflected light to fall outside the detector. This, however, could be confused by the detector as being responsive to a change in the reflectivity of the surface. Moreover, since the prior art detector is solely responsive to the intensity of the beam impinging upon it, compensations must be made for changes in temperature and humidity as these environmental factors may affect the amount of light which is permitted to travel between the light source and the detector via the reflective surface notwithstanding the reflective characteristics of the surface being inspected.

Obviously, these prior art devices are not suitable for use in providing precision microscopic surface inspection where the intended measurement comprehends not only the detection of surface flaws but also the relative change in elevation of the inspected surface area.

Heretofore, where the primary intent was to measure a surface contour, i.e., the relative separation between a series of microscopic surface areas and a reference plane or surface, a mechanical means has generally been utilized. In accordance with such apparatus, a very small mechanical probe is caused to bear upon the surface to be measured so as to stress a piezoelectric transducer in response to surface variations encountered as the probe is drawn across the surface. The disadvantages of such apparatus are, of course, obvious in that the device must be quite sensitive, and in most cases expensive. Furthermore, where the surface being measured is relatively soft, the sensor may itself produce undesirable distortion or scratches therein. Such apparatus is also subject to inaccuracies which result from the springing of the test probe as it procedes over bumps and hollows in the work piece surface. Furthermore, additional errors may be caused by the wearing or partial breakage of the relatively fine probe which must be utilized.

Whereas these prior art attempts to provide accurate surface inspection apparatus have been subject to numerous disadvantages, a new approach to the problem has been taken in accordance with the present invention in order to overcome these disadvantages.

OBJECTS OF THE PRESENT INVENTION

It is therefore a principal object of the present invention to provide a novel method and apparatus for inspecting a work material surface utilizing a non-surface contacting optical apparatus which is independent of variations in the light intensity of the scanning light beam.

Another object of the present invention is to provide a novel surface inspecting method and apparatus for determining a positional relationship between a microscopic surface area and a predetermined reference surface.

Still another object of the present invention is to provide a novel method and apparatus for optically scanning the surface of a machined or polished work piece so as to permit a qualitative evaluation to be made thereof.

Still another object of the present invention is to provide a novel optical scanning apparatus for scanning a work surface to determine the microscopic contour thereof.

Still another object of the present invention is to provide a novel optical scanning device for detecting microscopic variations in a material surface and producing electrical signals responsive thereto which are independent of the intensity of the scanning beam.

Still another object of the present invention is to provide a novel optical transducing apparatus for scanning a surface which has been previously distorted in a predetermined manner so as to enable the subsequent reconstruction of the distortion producing impetus.

Still another object of the present invention is to provide a novel optical transducing apparatus which is responsive to fluid pressure variations.

Still another object of the present invention is to provide a novel optical apparatus which is responsive to motions of a non-scanned surface, i.e., vibration, acceleration, and other sensing or related applications.

SUMMARY OF THE INVENTION

The apparatus of the present invention includes a radiant energy source for illuminating a microscopic area of a surface to be monitored or evaluated, an optical tracking detector or detector ensemble, which produces an output signal responsive to the position of a light spot case thereupon and an optical lens system for imaging the illuminated surface area onto the detector. Both the illuminating means and the imaging lens system have their optical axes angularly disposed relative to the work surface so that a change in the elevation of the illuminated surface area will produce a shift in the position of the illuminated surface area about the optical axis of the lens system. And since a change in the apparent location of the illuminated spot relative to the lens system causes a concomitant relocation of the spot imaged onto the detector, an accurate means of detecting surface variations is provided.

One advantage of the present invention is that increments of surface elevation variation smaller than ¼ wavelength of light may be easily measured, the principal sensitivity determining factors being the optical level arm ratios of the detector optical system, the statistical noise in the optical signal, the grain limited resolution of the detector apparatus and the sensitivity of the electrical read out means.

A further advantage of the present invention over related measuring techniques is that no correction is necessary for temperature and humidity, i.e., normal variations in the characteristics of the medium through which the light beam is passed do not affect the accuracy of the measurement. Furthermore, distances vastly greater than the surface variations being measured can be traversed by the light beam without producing changes in measurement values, i.e., large standoff distance is achievable.

Still another feature of the present invention is that the detector means is caused to zero out changes in light intensity whether they originate in the source, the scattering loses of the medium being traversed, or more importantly, the reflectivity of surface. Moreover, the system nullifies differences in surface reflectivity and measures only distances from preset datums by geometric change in spot position on a detector which produces an output responsive to position, said output being a known function of spot position.

Still other objects and advantages of the present invention will become apparent to those skilled in the art after having read the foregoing detailed description of the preferred embodiments of the invention which are illustrated in the several figures of the drawing.

IN THE DRAWING

FIG. 1 is a diagramatic illustration showing the method of operation of the present invention.

FIG. 2 is another illustration of the manner of operation of the present invention.

FIG. 3 is an illustrative diagram of a disc scanning apparatus in accordance with the present invention.

FIG. 4 is an illustration of a sonic wave detector apparatus, or the like, in accordance with the present invention.

FIG. 5 is an illustration of an alternative type of detector which may be utilized in accordance with the present invention.

FIG. 6 is an illustration of another alternative detector apparatus which may be utilized in accordance with the present invention.

DETAILED DESCRIPTION OF THE PREFERRED EMBODIMENTS

Referring now to FIG. 1 of the drawing, the method of operation of the present invention is illustrated. A source of radiant energy 10 is used to provide a beam of light which is passed through a collecting lens system 12, the optical axis of which is aligned relative to a surface S, lying in a datum plane 14, at an angle $i$ and separated therefrom by a distance Q so that the rays of light passing therethrough are caused to focus at the surface of the datum plane 14. The lens system 12 is preferably chosen so that the size of the spot produced on the work surface does not substantially change over the range of surface variations to be measured.

A collecting lens means 16 is positioned relative to the point Q at a distance $L_1$ therefrom so that light emanating from the point P, whether direct reflecting or scattered, will pass through the collecting lens means 16 and be refocused at some point I which lies in a plane 18 at a distance $L_2$ from the lens 16. Since any source of illumination which is within the field of view of the lens 16 will be refocused at some point on the other side thereof, and since the rays of light which emanate from the optical system 12 must strike a surface lying therebeneath at some point along the line 20, it will be apparent that if a surface S, originally positioned to lie in the plane 14, is moved upwardly, so as to lie in the plane 22, for example, the light spot produced thereon will appear to move leftwardly along the optical axis 20 to the point P' and the image thereof will be projected by the lens 16 onto the image plane 18 at the point I'.

Similarly, if the surface S is moved downwardly to lie in the plane illustrated at 24, the illuminated spot will appear at point P'' along the axis 20 and will be projected onto the image plane 18 by the lens 16 at the point I''. Thus, it can be seen that any change in the elevation of the surface S with respect to the datum plane 14 will cause a corresponding change in the position of the light spot projected thereupon relative to the optical axis of the lens 16, and consequently, a corresponding change of the position of the spot projected on the image plane 18 will be produced. Moreover, since the light source axis 20 and the image plane 18 have been chosen herein, for purposes of illustration, as lying parallel to one another with the optical axis of lens 16 normal to both, it can easily be shown that the distance $a$ between the points P and P' will be related to the distance A on the image plane 18 between the points I and I' and, correspondingly, the distance $b$ along the axis 20 will be related to the distance B along the image plane 18 in accordance with the relationships $$\frac{a}{A} = \frac{L_1}{L_2} \qquad (1)$$

and $$\frac{b}{B} = \frac{L_1}{L_2} \qquad (2)$$

where $L_1$ and $L_2$ act as optical lever arms for the lens 16.

Furthermore, since the optical axes of the lens systems 12 and 16 are for purposes of illustration chosen as lying at right angles to each other, it can be seen that the change in surface elevation, i.e., the distance $c$ between the planes 14 and 24 can be determined by simply measuring the changes in the position of the images produced on the image plane 18 and solving the equations $$c = A \times \frac{L_1}{L_2} \times \frac{1}{2 \sin i} \qquad (3)$$

and $$d = B \times \frac{L_1}{L_2} \times \frac{1}{2 \sin i} \qquad (4)$$

Thus, by positioning a suitable light sensing means in the plane 18 which is capable of producing an output responsive to the distance between the imaged spot and the datum point I will enable a direct quantitative determination to be made of any change in the elevation of the surface S from the datum plane 14. Although it is convenient for purposes of illustration to position the optical axes of the lens systems 12 and 16 at right angles to each other it will be understood that they may be placed at any angle relative to each other since the apparatus is insensitive to the degree of reflectivity of the surface being scanned or monitored since either scattered light or reflected light will be imaged onto the detector by means of suitably sized lens 16.

In FIG. 2 of the drawing, a simplified embodiment of the present invention is illustrated. The apparatus includes a source of coherent light 30 such as a laser, or the like, for providing a light beam 32 which is passed through the lens system 34. The lens system 34 causes the light to be focused at a point 36 lying in the reference plane 38. A collecting lens 40 is positioned as illustrated so as to have its optical axis intersect the point 36 at some angle α which need not bear any relationship to the angle of incidence *i* of the illuminating beam provided by the laser 30 since either scattered light or reflected light from the illuminated surface will be imaged by the lens 40. For a specular surface, α is restricted so that a sufficient portion of the light enters the collecting lens.

An image position sensing device 42, which may, for example, be a Schottky photodiode optical position detector such as the PIN–SC/10 or PIN–SC/25 photodiode manufactured by United Detector Technology, is positioned so as to have its sensitive surface lie transverse to the optical axis of the lens 40 with its midpoint 44 aligned with the optical axis of the lens 40. The detector 42 provides a continuous analogue signal which is responsive to the position of the centroid of the incident light beam and its accuracy is thus substantially independent of the size or shape of the incident image. The output leads of the photodiode 42 are coupled to the input terminals of a ratio detector 46 that drives a suitable display means 48 which may be in the form of a meter, oscilloscope, recorder or other suitable apparatus. The ratio detector 46, upon receiving the output of the photodiode 42, corrects for amplitude variations in the signal caused by differences in the incident beam intensity so that within its range of operation the signal supplied to the indicator 48 is only responsive to the position of the beam imaged upon the detector 42 and is in no way responsive the intensity of the illumination directed thereupon. Such correction or compensation, for the PIN–SC/10 Schottky diode manufactured by United Detector Technology, is achieved by computing the ratio of the differences of the output currents (position information) to the sum of the output current (intensity) since the position of the beam is proportional to the difference in the output current.

It will be noted from the drawing that if an irregular surface 50 is being scanned by the device and the illuminating beam strikes the surface at a point below the datum plane 38, the position of the image produced upon the detector 42 will be toward the left of the midpoint 44, as at point 52, so as to produce an output signal indicative thereof. However, when the scanned surface is as shown by the dashed lines 54, so that the source beam intersects the surface 54 above the datum plane 38, the resultant image produced upon the surface of the detector 42 will be toward the right of the midpoint 44, as at point 56, and an output responsive thereto will be supplied to the meter 48 to cause an appropriate indication thereon.

The present invention, as embodied in FIG. 2, can be utilized to obtain an accurate profile of any scanned surface which is capable of reflecting, broadly speaking, enough light into the optical means 40 so as to produce a detectable image upon the detector 42. It will be appreciated that the surface being detected can be solid, liquid, particulate or even gaseous so long as the apparent position of the light reflected therefrom changes in response to some condition sought to be measured.

Turning now to FIG. 3 of the drawing, a practical application of the invention is illustrated in the form of a means for inspecting the surfaces of a disc such as a magnetic recorder disc or any other similar device having surfaces which are to be microscopically inspected. In accordance with this embodiment, the disc 60 is mounted to a rotatable shaft 62 which is rotatably driven by a motor 64 and is driven laterally by a telescopic positioning means 66.

A laser 68 or other source of coherent light is directed onto a beam splitting means 70 which directs the beam onto reflecting mirrors 72 and 74 which again change the direction of the beams so as to direct them respectively through the collecting means 76 and 78. The collecting means cause the respective beams to be focused onto the upper and lower surfaces of the disc 60 as illustrated via the reflectors 80 and 82. The lens means 84 and 86 are positioned so as to optically inspect the disc portions illuminated by the forward light beams and project the illuminated spot onto the image position detectors 88 and 90 via the reflectors 92 and 94.

Responsive to the outputs of the detectors 88 and 90, respectively, are a pair of ratio detectors 96 and 98 the outputs of which are fed into a suitable indicator means such as the recorder 100 which produces a permanent record of the detected signals. With the disc 60 being rotated by the motor 64 at some suitable speed, the surface thereof can be spirally scanned by using the positioning means 66 to provide simultaneous lateral displacement. For example, at any given motor speed the pitch of the surface scan can be selected by choosing an appropriate lateral displacement rate. The lateral resolution of the scan is determined by the sharpness of focus of the interrogating light beam at the disc surface. The vertical resolution is determined by the respective lengths of the optical lever arms of the lens systems 84 and 86, by detector and electronic resolution, and by the various noise sources.

Since this device is responsive to relative elevation changes in the microscopic surface areas illuminated, the device can be used not only to inspect surface flaws but also as a readout means for phonograph recordings, memories, or the like, by suitably amplifying the outputs of the ratio amplifiers 96 and 98. Where the disc or other surface is of a relatively heat sensitive material, means must be provided for restricting the power of the incident laser beam to an acceptable intensity so as to prevent heat damage to the surface.

Referring now to FIG. 4 of the drawing, an alternate embodiment of the present invention is illustrated which can be used for measuring fluid pressure variations such as might be caused by sonic waves, tidal action, vibratory excitations of fluid or solid surfaces, etc. In this embodiment an illuminable membrane 110 structurally suited to the particular application is mounted so as to be subjected to the fluid pressure variations which are to be measured. The membrane may be totally immersed if the liquid will transmit light. A light beam created by the laser source 112 is focused onto the back side thereof using the mirrors 114, 116, and 118 and the light collecting means 120. A second light collecting means 122 is positioned relative to the membrane 110 so that the position of the spot illuminated by the incident light beam will lie within its field of view so that the illumination spot can be imaged via reflector 128 onto the sensitive surface of an image position sensitive detector means 124. The output of the detector 124 is fed into a suitable indicator means 126.

In operation, the coherent light beam generated by the laser 112 is reflected into the collecting means 120 so as to be focused onto the rear surface of the membrane 110 which may be of any resilient material having suitable plastic qualities. The characteristics of the membrane 110 would, of course, be dependent upon the particular application but suffice it to say that the mass must be at least low enough to follow the fluid pressure variations to be measured. Since the lens 122 is positioned with its optical axis intersecting the quiescent point 130, the illuminated area will be imaged onto the midpoint 132 of the detector 124 when no pressure differential appears across the membrane 110. However, any change in pressure across the membrane will cause the same to be deflected, as to the position 134 illustrated by the dashed lines, so that the laser beam now illuminates the spot 130' which is consequently imaged upon the detector 124 at the point 132'. Thus with the membrane 110 so designed that it is dynamically capable of following the measured pressure variations with a high degree of accuracy, a very sensitive pressure measuring device is provided since the only mechanical motion involved in the measurement is that of the surface of the membrane.

Turning now to FIGS. 5 and 6, alternative optical tracking detectors are illustrated. In the embodiment of FIG. 5, the detector is comprised of a standard photosensitive element 140 having a wedge-shaped light impeding medium 142 positioned adjacent the light sensitive face thereof-so that the intensity of the light reaching the face of the detector 140 at point 144 would be proportionately greater than that reaching the detector when the beam is in the positions 146 and 148. Thus, even though the detector 140 is comprised of a simple photosensitive element, the output thereof is responsive to the positioning of the light beam across the face thereof. In order to compensate for any changes in the intensity of the light beam 145, a portion of the incident light beam might be deflected onto a second photosensitive element and the output of that element and the element 140 would be fed into a differential amplifier so as to effectively nullify the effect of intensity variations in the beam reflected from the surface being inspected.

In FIG. 6, a similar detector is illustrated which likewise includes a photosensitive element 150 having an optically opaque device 152 with a triangular slit 154 therein positioned across the face thereof. In this device the amount of light reaching the face of the photosensitive element 15 from a defocused or collimated imaging beam 156 being swept thereacross will be less as it is swept to the right therefore producing an output which is responsive to the position of the image on the face thereof. Here again, where there is a possibility of variation in the intensity of the beam 156 a differential means can be provided to cancel out the effect of any such variation so as to make the output responsive only to image position.

Although these devices are somewhat simpler in construction than the Schottkey photodiode which actually measures the position of the centroid of the light spot imaged onto the face thereof, they can be suitably utilized for many applications.

Whereas only a few of the possible modifications of the present invention have been particularly set forth herein it is contemplated that many more modifications and uses of the present invention will be recognized by those skilled in the art. However, since the basic concept involved is that of focusing a spot of light onto a surface to be monitored and then using optical leverage principles to determine the apparent shift in position of the illuminated spot caused by any change in the elevation of the microscopic area being illuminated, we therefore, intend that the scope of the claims be interpreted as covering all such modifications and uses as fall within the true spirit and scope of the invention.

What is claimed is:
1. Apparatus for inspecting a surface comprising:
 a radiant energy source:
 radiant energy collecting means positioned between said source and said surface for focusing radiant energy from said source onto a selected segment of said surface;
 radiant energy detecting means, including a radiant energy sensitive element, discriminatively responsive to the portion of said sensitive element which is irradiated by radiant energy and operative to provide output signals commensurate with the position of the irradiated portion; and
 radiant energy projecting means positioned between said sensitive element and said surface, said projecting means having an optical axis which intersects said selected surface segment and is angularly disposed relative thereto for projecting at least a portion of the radiant energy reflected from said selected surface segment onto said sensitive element, said detecting means thereby providing output signals commensurate with the elevation of said selected surface segment relative to a predetermined reference elevation.

2. Apparatus for inspecting a surface in accordance with claim 1 wherein the point of intersection of the optical axes of said collecting means and said projecting means define said predetermined reference elevation so that variations in the elevation of said selected surface segment produce variations in the position of the radiant energy from said selected surface segment projected onto said sensitive element.

3. Apparatus for inspecting a surface as recited in claim 1 wherein said sensitive element is an optical position detector of the Schottky photodiode type which produces an output signal commensurate with the centroidal position of a luminous spot projected thereon.

4. Apparatus for inspecting a surface as recited in claim 1 wherein said detecting means further includes means responsive to the output signals from said sensitive element and operative to make said output signals independent of the intensity of the radiant energy projected onto said sensitive element.

5. Apparatus for inspecting a surface as recited in claim 2 wherein said source is a laser.

6. Apparatus for inspecting a surface in accordance with claim 1 which further includes means to move said surface in a predetermined manner relative to said collecting means and projecting means so that other portions of the surface successively become said selected segment.

7. Surface inspection apparatus comprising:
 illumination source means positioned relative to the surface to be inspected for illuminating a selected surface segment of said surface, said source means having a first optical axis intersecting said surface at said surface segment at a first predetermined fixed angle; and
 illumination sensing means positioned relative to said surface for sensing the direction of the illumination reflected from said illuminated surface segment, said sensing means having a second optical axis intersecting said surface at said surface segment at a second predetermined fixed angle and said first optical axis at a third predetermined fixed angle, said sensing means being responsive to the centroidal position of the illumination reflected from said illuminated surface segment and operative to provide direct reading electrical output signals commensurate with such centroidal position.

8. Surface inspection apparatus as recited in claim 7 wherein said source means includes a source of coherent light and a means for focusing the coherent light at a point proximate the intersection of said first and second optical axes.

9. Surface inspection apparatus as recited in claim 8 wherein said sensing means includes a photosensitive detector means which is responsive to the centroidal position of an intercepted beam of coherent radiation and an optical collector means for projecting reflected illumination from said surface segment onto said photosensitive detector means.

References Cited
UNITED STATES PATENTS

| 2,215,211 | 9/1940 | Devol | 356—212 |
| 3,137,756 | 6/1964 | Guther | 356—1 |
| 3,340,763 | 9/1967 | Power | 356—1 |

RONALD L. WIBERT, Primary Examiner

O. B. CHEW II, Assistant Examiner

U.S. Cl. X.R.

250—219 R; 356—156